Patented July 4, 1933

1,916,216

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

2-AMINO-10-ANTHRONES AND A PROCESS OF PREPARING THE SAME

No Drawing.    Application filed July 2, 1928. Serial No. 290,029.

This invention relates to the 2-amino-10-anthrones and to a method of preparing these compounds.

It is an object of this invention to provide a method whereby these products are made technically available, as they are valuable intermediate products for the preparation of dyestuffs.

Other and further important objects of this invention will become apparent from the following description and appended claims.

We have now found that 3'-amino and 3'-amino 4'-substituted benzyl ortho benzoic acids or their N substituted derivatives may be condensed with the loss of one molecule of water to form 2-amino and 2-amino-3 substituted 10-anthrone or the N substituted 2-amino and 2 amino-3 substituted 10-anthrones respectively. In forming the 2-amino-3-substituted-10-anthrones or their N-derivatives it is our belief that the condensation takes place in such a manner that a larger proportion of the 2-3-10 isomer is obtained than is obtained by the corresponding condensation of the 3'-amino-4'-substituted benzoyl ortho benzoic acids. According to our experience, the products obtained by the present invention are practically free of the 1-2-9 isomer. This result, however, may be due to the mode of isolation of the anthrone, whereby the isomeric body if formed is eliminated.

The condensation of the 3'-amino and 3'-amino-4'-substituted benzyl ortho benzoic acids, or the N substitution products thereof, to form 2 amino and 2-amino-3 substituted 10-anthrones, or N substitution products thereof, is probably best expressed by the following chemical equation.

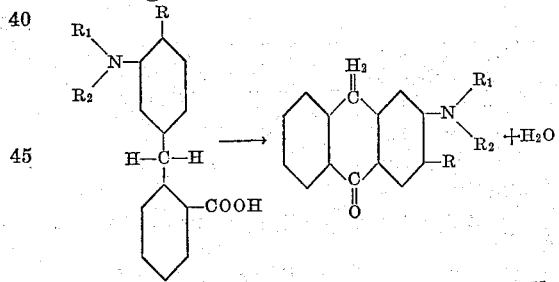

wherein R is a hydrogen atom or an alkyl, alkoxy, halogen or like group and wherein $R_1$ and $R_2$ are hydrogen atoms or acidyl groups, such as acetyl, phthaloyl and the like.

The condensation of these bodies to effect elimination of one molecule of water and close the ring to form a 2-amino and 2-amino-3-substituted 10-anthrone and an N substituted 2-amino and 2-amino-3-substituted 10-anthrone may be brought about in a variety of ways. We employ in general similar methods to those used for the condensation of amino benzoyl ortho benzoic acid to the anthraquinone body, as for example, condensation in sulfuric acid, oleum and the like, or in acetic acid with dehydrating agents like phosphorus pentoxide, phosphorus pentachloride and the like. The maximum yields of the products in specific cases will depend to a large extent upon the specific method employed. In case an N substituted anthrone, as for example, an acetyl or phthaloyl is desired, it is preferable to employ lower temperatures so that the acidyl group will not be hydrolyzed. The preparation of the acidyl derivatives in certain cases is desirable, for among other objects, the acidyl derivatives can be isolated in a more economically practical manner.

Among the new products which we include in our invention are, for example, the following: 2 - amino - 10 - anthrone - 2 - amino - 3 - chloro-10-anthrone, 2-amino-3-methoxy-10-anthrone, 2-amino-3-ethoxy-10-anthrone, 2-amino-3-methyl-10-anthrone and their N substituted derivatives. Other 2-amino-3-substituted 10-anthrones, however, are intended to be included in this invention.

The 2-amino-3-substituted-10-anthrones are for the most part yellowish solids which may be recrystallized from benzene in the form of bright yellow needles. They are, in general, soluble in dilute mineral acid, especially in hot acid, forming the corresponding salts, which can be precipitated out by the further addition of acid or by cooling. By the addition of large amounts of water, the salts are hydrolyzed to the free amine and may then be separated as a bright yellow precipitate. They are practically insoluble in dilute sodium carbonate solution, but somewhat soluble in hot dilute caustic soda solution imparting to the solution a bright yellowish red color with a strong yellow fluorescence. They are easily soluble in glacial acetic acid and are converted into the acetyl derivative by means of acetic anhydride. The acetyl, as well as other acidyl derivatives, can be hydrolyzed to the amine by methods adapted to hydrolyze similar bodies. Concentrated sulfuric acid at temperatures above 80° C. decompose the products with the evolution of sulfur dioxide.

Without limiting our invention to any particular procedure, the following examples in which parts by weight are given, will serve to illustrate our method in its preferred form.

*Example 1*

Into 200 parts of sulfuric acid monohydrate are introduced 26.1 parts of 3'-amino-4'-chloro benzyl ortho benzoic acid, keeping the temperature below 30° C. After solution is practically complete, 100 parts of 25% oleum are added over a period of ½ hour. The mass is then poured into ice and water (total of 700 parts). The precipitate which forms on cooling and diluting is filtered off and suspended in about 500 parts of water. Sufficient sodium carbonate is now added to make the mixture alkaline and the mass is agitated thoroughly. The precipitate formed is filtered off, washed with cold water to free it of inorganic salts and dried. The product is 2-amino-3-chloro-10-anthrone. It can be recrystallized from benzene in the form of yellow crystals.

*Example 2*

Into 180 parts of monohydrate are introduced 27.1 parts of 3'-amino-4'-ethoxy benzyl ortho benzoic acid. While adding the benzyl benzoic acid, the mass is kept below 40° C. After charging it is heated to 50 to 55° C. and kept at this temperature for 15 minutes. The mass is then poured into ice and water (total 700 parts) and sodium carbonate is added until the mass is strongly alkaline. The product is filtered off, washed with a small amount of cold water and dried. The product obtained is 2-amino-3-ethoxy-10-anthrone. It can be recrystallized from benzene in the form of yellow crystals having a melting point of 200 to 201° C.

*Example 3*

2-amino-3-methoxy-10-anthrone can be prepared in an analogous manner from 3'-amino-4'-methoxy benzyl ortho benzoic acid. When recrystallized from benzene it has a melting point of 190 to 192° C.

*Example 4*

Into 75 parts of glacial acetic acid are charged 10 parts of 3'-amino-4'-chloro benzyl ortho benzoic acid. There are then added 25 parts of acetic anhydride and the mass is heated to reflux for a short time. It is then cooled to 50° C. and there are added 10 parts of phosphorus pentoxide. The mass is again heated to reflux for a short time, cooled to 60 to 70° C. and about 200 parts of water added, or water is added until the anthrone starts to crystallize. The mass is cooled to room temperature and filtered. The filter cake is washed with a little hot water and dried at 100° C. The product is 2-acetyl-amino-3-chloro-10-anthrone. It can be recrystallized from glacial acetic acid in the form of crystals which melt at 253–255° C. under decomposition.

Other acidyl and N substituted 3'-amino-4'-substituted benzyl ortho benzoic acids may be condensed in a similar manner to form the N substituted 2-amino-3 substituted 10-anthrones.

We are aware that numerous details of the process may be varied through a wide range without departing from the principles of this invention, and we, therefore, do not purpose limiting the patent granted hereon otherwise than necessitated by the prior art.

We claim as our invention:

1. As new products, 2-amino-10-anthrones in a form substantially free from isomers having most probably the following chemical constitution:

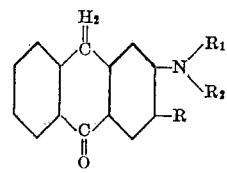

in which R is a hydrogen atom, a halogen, alkoxy or alkyl group and $R_1$ and $R_2$ hydrogen atoms or a hydrogen atom and an acyl group or two acyl groups.

2. As new products, 2-amino-10-anthrones in a form substantially free from isomers having most probably the following chemical constitution:

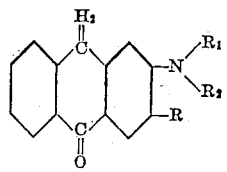

in which R is a hydrogen atom or a halogen, alkoxy or alkyl group, and $R_1$ and $R_2$ are either two hydrogen atoms or a hydrogen atom and an acetyl or a phthaloyl group.

3. As a new product, 2-amino-3-chloro-10-anthrone.

4. As a new product, 2-amino-3-ethoxy-10-anthrone.

5. As a new product, 2-amino-3-methoxy-10-anthrone.

6. As new products, anthrones in a form substantially free from isomers and characterized by possessing in their structure the following atomic grouping:

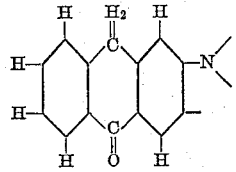

7. The process of preparing anthrones in a form substantially free from isomers and having most probably the following chemical constitution:

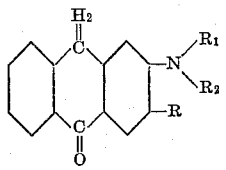

in which R is a hydrogen atom, a halogen, an alkoxy or alkyl group and $R_1$ and $R_2$ are hydrogen atoms or a hydrogen atom and an acyl group or two acyl groups which comprises treating a benzyl ortho benzoic acid having most probably the following formula:

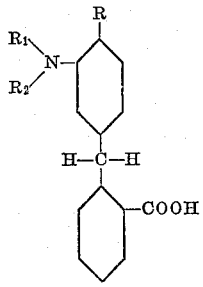

in which R, $R_1$ and $R_2$ have the same meaning as above, in concentrated sulphuric acid to effect closing of the ring.

8. The process of preparing anthrones in a form substantially free from isomers and having most probably the following chemical constitution:

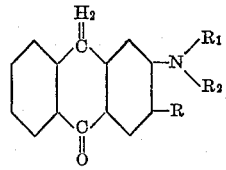

in which R is a hydrogen atom or a halogen, an alkoxy or alkyl group and $R_1$ and $R_2$ are either two hydrogen atoms or a hydrogen atom and an acetyl or a phthaloyl group which comprises treating a benzyl ortho benzoic acid having most probably the following formula:

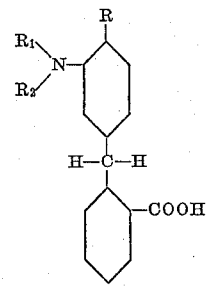

in which R, $R_1$ and $R_2$ have the same meaning as above, in oleum at a temperature below 55° C. to effect closing of the ring.

In testimony whereof we have hereunto subscribed our names at Carrollville, Milwaukee County, Wis.

IVAN GUBELMANN.
HENRY J. WEILAND.
OTTO STALLMANN.